(12) United States Patent
Hassan et al.

(10) Patent No.: US 9,122,857 B1
(45) Date of Patent: Sep. 1, 2015

(54) AUTHENTICATING A USER IN AN AUTHENTICATION SYSTEM

(75) Inventors: Daniel Hassan, Ra'anana (IL); Shai Granot, Tel Aviv (IL); Roy Hodgman, Wenham, MA (US)

(73) Assignee: EMC Corporation, Hopkinton, MA (US)

( * ) Notice: Subject to any disclaimer, the term of this patent is extended or adjusted under 35 U.S.C. 154(b) by 25 days.

(21) Appl. No.: 13/428,110

(22) Filed: Mar. 23, 2012

(51) Int. Cl.
*G06F 7/04* (2006.01)
*G06F 17/30* (2006.01)
*G06F 15/16* (2006.01)
*H04L 29/06* (2006.01)
*G06F 21/32* (2013.01)

(52) U.S. Cl.
CPC ..................... *G06F 21/32* (2013.01)

(58) Field of Classification Search
CPC ........................................................ G06F 21/32
USPC ..................................................... 726/7, 2–21
See application file for complete search history.

(56) References Cited

U.S. PATENT DOCUMENTS

| 2003/0163739 | A1* | 8/2003 | Armington et al. | 713/202 |
| 2007/0027816 | A1* | 2/2007 | Writer | 705/65 |
| 2010/0131279 | A1* | 5/2010 | Pilz | 704/273 |

OTHER PUBLICATIONS

EMC, RSA SecurID700 Authenticator, Jul. 10, 2009, http://www.emc.com/collateral/data-sheet/rsa-secureid-700-authenticator-ds.pdf.*

* cited by examiner

*Primary Examiner* — Andrew Nalven
*Assistant Examiner* — Khang Do
(74) *Attorney, Agent, or Firm* — Krishnendu Gupta; Jason A. Reyes

(57) ABSTRACT

There is disclosed method and system for authenticating user in authentication system comprising verifier and authentication device configured such that verifier and device comprise secret. A first voice sample of user recorded in verifier. Authentication information is generated in device. The device configured such that information generated is dynamic information based on secret. The information generated in device presented to user. An input signal received in verifier comprising a second voice sample of user and response by user to information. The input signal received in verifier in response to user responding to information by voicing response to information. The first and second samples compared in verifier. The information generated by device and response by user to information compared in verifier. An authentication result generated in verifier based on comparison of first and second samples and comparison of information and response. The result used for authenticating user.

20 Claims, 3 Drawing Sheets

AUTHENTICATING A USER IN AN AUTHENTICATION SYSTEM

TECHNICAL FIELD

The invention relates to authenticating a user in an authentication system.

BACKGROUND OF THE INVENTION

Generally, security systems employ an identity-based authentication scheme to verify the identity of an entity before granting access to an access-controlled resource. One goal of such security systems is to accurately determine identity so that an unauthorized party cannot gain access. Security systems can use one or more of several factors, alone or in combination, to authenticate entities. For example, identification systems can be based on something that the entity knows, something the entity is, or something that the entity has.

Examples of something an entity knows are a code word, password, personal identification number ("PIN") and the like. One exemplary computer-based authentication method involves the communication of a secret that is specific to a particular entity or user. The entity seeking authentication transmits the secret or a value derived from the secret to a verifier, which authenticates the identity of the entity. In a typical implementation, an entity communicates both identifying information (e.g., a user name) and a secret (e.g., a password) to the verifier. The verifier typically possesses records that associate a secret with each entity. If the verifier receives the appropriate secret for the entity, the entity is successfully authenticated. If the verifier does not receive the correct secret, the authentication fails.

Examples of something the entity is include a distinct characteristic or attribute known as a biometric. It will be known by those skilled in the art that a biometric is a unique physical or behavioral characteristic or attribute that can be used to identify a person uniquely. Biometrics encompass a variety of techniques designed to accurately identify a person including fingerprinting, facial recognition, eye retina patterns, DNA sequences, voice and body movement recognition, handwriting and signature recognition. It will appreciated that some physical or behavioral characteristics or attributes are typically not under the control of the person, and are therefore difficult for anyone besides the intended person to present, because, in part, they are difficult to replicate. The verifier typically can observe these physical or behavioral characteristics or attributes and compare these to records that associate the characteristics or attributes with the entity. The observation of these characteristics or attributes is referred to generally as biometric measurement.

An example of something an entity possesses is a physical or digital object, referred to generally as a token, that is unique, or relatively unique, to the user. It will be appreciated that possession of a token such as a bank card having certain specific physical and electronic characteristics, for example containing a specific identification number that is revealed when the token is accessed in a particular manner, can be this type of factor. A token containing a computing device that performs encryption using an encryption key contained in the device would also be regarded as this type of factor. For example, a token could accept user input, which might include a PIN or a challenge value, and provide as output a result encrypted with a secret encryption key stored in the card. The verifier can then compare the output to an expected value in order to authenticate the entity.

A token can also use input information, such as time, or a counter, for example, such that the result changes over time. These systems generally perform some computation using a stored secret as input to generate an authentication code that is used to authenticate the entity. Some systems are time-based in that they use a time-based dynamic variable to calculate a non-predictable authentication code that ultimately authenticates the entity. It will be appreciated that "non-predictable" used in this context means that the authentication code is not predictable by a party that does not know the associated secret, the algorithm for calculating the code, or both.

Although the dynamic nature of the authentication codes generated by such an approach avoids problems inherent with using fixed authentication codes, an unattended or stolen token remain vulnerable to attack. Would-be attackers who gain access to tokens can subject the tokens to sophisticated analysis intended to determine their methods of operation and/or the secret(s) stored within. Attackers might inspect the token and conduct such analysis in order to determine the associated secret, the algorithm for calculating the authentication code, or both. The attacker might then be able to generate apparently valid authentication codes in order to illegally gain physical or electronic access to secured areas or systems. Many tamper-resistant hardware designs are available, however, new attacks are frequently developed to thwart tamper resistance.

In view of these types of security threats, there is a need for stronger forms of authenticating a user in an authentication system.

SUMMARY OF THE INVENTION

There is disclosed a method and system for authenticating a user in an authentication system comprising a verifier and a user authentication device. The authentication system configured such that the verifier and the user authentication device comprise a shared secret. A first voice sample of a user is recorded in the verifier. Authentication information is generated in the user authentication device. The device is configured such that the authentication information generated is dynamic authentication information based on the shared secret. The authentication information generated in the user authentication device is presented to the user. An input signal is received in the verifier comprising at least a second voice sample of the user and a response by the user to the authentication information. The input signal is received in the verifier in response to the user responding to the presented authentication information by voicing the response to the authentication information. The recorded first voice sample and the received second voice sample are compared in the verifier. The authentication information generated by the user authentication device and the response by the user to the authentication information is also compared in the verifier. An authentication result is generated in the verifier based on the comparison of the first and second voice samples and the comparison of the authentication information and the response to the authentication information. The authentication result can be used for authenticating the user.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION

The invention can be implemented in numerous ways, including as a process, an apparatus, a system, a computer program embodied on a computer readable storage medium, and/or a processor, such as a processor configured to execute instructions stored on and/or provided by a memory coupled to the processor. In this specification, the implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
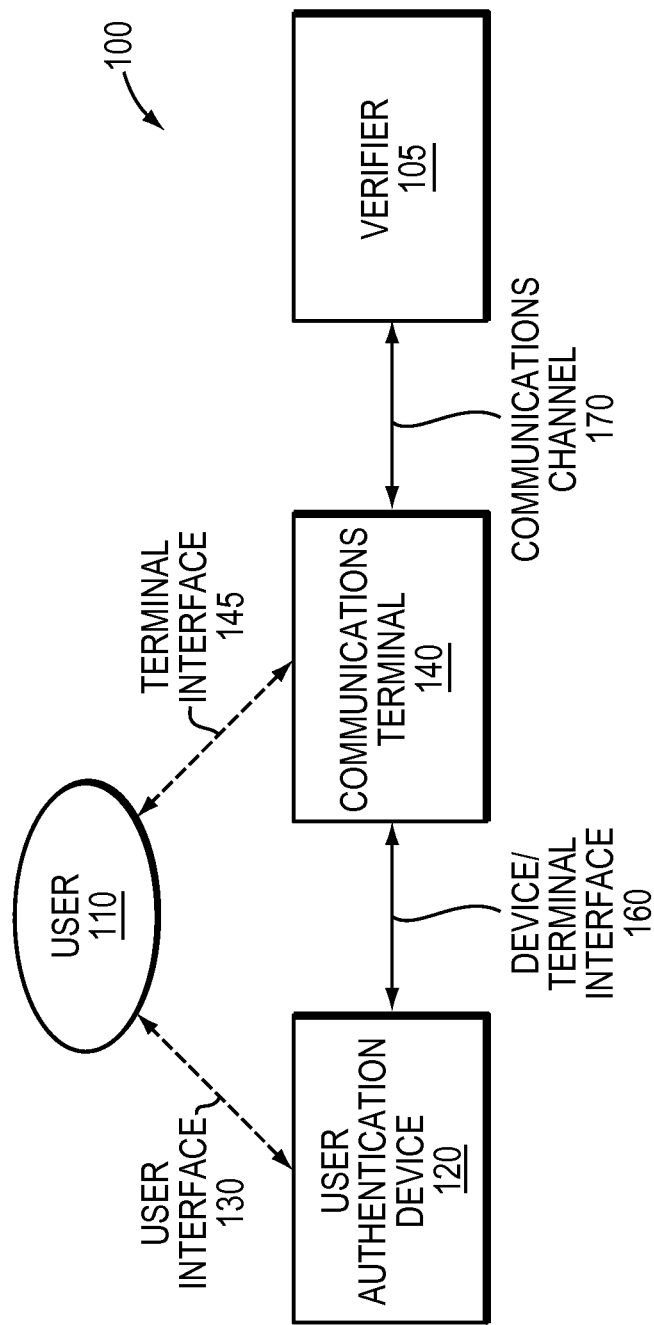
FIG. 1 is a block diagram of an authentication system comprising a verifier and a user authentication device.

Referring to FIG. 1, there is illustrated an authentication system 100 comprising a verifier 105 for securely authenticating the identity of an exemplary user 110. As used herein, "authenticate" means to verify the identity of a user, and so "authenticate" and "verify" can be used interchangeably throughout. Also, although the specification will discuss, for simplicity, authentication of "users," it should be understood that "users" means any entity requiring authentication such as, for example, a person, animal, device, machine, or computer. The inclusion of a single user 110 is exemplary, and typically a verifier 105 will be used to verify a large number of users 110. Similarly, the inclusion of a single verifier 105 is exemplary, and typically a user 110 can have an authentication attempt verified by one or more of a large number of verifiers 105. In some embodiments, a single verifier 105 is able to verify a user 110, while in other embodiments, two or more verifiers 105 are together required to perform this task.

The verifier 105 can be any sort of device that implements the functions described herein. In one embodiment, the verifier 105 is implemented as software running on a server class computer including a processor, memory, and so on, to enable authentication of a large number of users, for example, in an enterprise. The verifier 105 can also be implemented as software running on a desktop computer, laptop computer, special-purpose device, a smart-phone or personal digital assistant (PDA). For example, the verifier 105 can be implemented as a software program running on a general-purpose computer, possibly interacting with one or more other computer programs on the same or a different computer. Some or all of the verifier 105 functionality can be implemented in hardware, for example in an Application Specific Integrated Circuit (ASIC) and the like. In still further embodiments, the verifier 105 can be implemented in a cellular telephone, or specialized hardware embedded in a cellular telephone and adapted to interact with the cellular telephone's circuitry. It will be appreciated by those skilled in the art that other sizes, shapes, and implementations are also possible.

Authentication can result in the performance of one or more actions including, without limitation, providing access or privileges, taking action, or enabling some combination of the two. Access includes, without limitation: access to a physical location, communications network, computer system, and so on; access to such services as financial services and records, health services and records and so on; or access to levels of information or services. The user 110 and the verifier 105 can be physically near one another or far apart.

As illustrated, a user 110 can communicate with a user authentication device 120. The user authentication device 120 provides information used to authenticate the user 110. The user authentication device 120 can provide a user interface 130. Communication between the user 110 and the user authentication device 120 can take place via this user interface 130. The user interface 130 can provide an input interface, an output interface, or both. An input interface enables the user 110 to communicate information to the user authentication device 120. The input interface can be any mechanism for receiving user input, and can include, without limitation: a keypad or keyboard; one or more push buttons, switches or knobs; a touch sensitive screen; a pointing or pressing device; a trackball; a device for capturing sound or voice or handwriting; a device for capturing biometric input (such as a fingerprint, retina or voice characteristic); and so forth. An output interface enables the user authentication device 120 to communicate information to the user 110 and can be any mechanism for communicating to a user, including, without limitation: a visual display to support alphanumeric characters or graphics such as a LCD display or LED display; an electrophoretic display; one or more light sources; a loudspeaker, a sound or voice generator; a vibration interface; and so forth. In some embodiments, the user 110 provides, via the user interface 130, identifying information (such as a user identifier, PIN, or password, or a biometric characteristic such as a fingerprint, retina pattern, or voice sample), or possessions (such as physical keys, digital encryption keys, digital certificates, or authentication tokens) to the user authentication device 120.

The user authentication device 120 can take various forms in various embodiments provided that the user authentication device 120 performs the functions required of the user authentication device 120 for secure authentication. The user authentication device 120 can be implemented in packages having a wide variety of shapes and form factors. For example, the user authentication device 120 can be a credit-card sized and shaped device, or can be much smaller or much larger. One credit-card sized embodiment of the user authentication device 120 includes a microprocessor with on-board memory, a power source, and a small LCD display. The embodiment optionally includes a keypad or buttons for PIN entry, entry of authentication information requests, or for other entry or interaction with the device 120. In another embodiment, a credit-card sized device 120 includes a processor with on-board memory that is used as a "smart card," that can be installed into another device that provides power and/or interface. In still other embodiments, a credit-card sized device 120 is a card such as a credit card including a magnetic strip or other data store on one of its sides. In other embodiments, the user authentication device 120 is a "key fob," that is, a smaller device with a display and battery that is sized and shaped to fit on a key ring. In yet another embodiment, the user authentication device 120 is a peripheral device that communicates with a computer, telephone, or other device, such as a USB dongle. In still other embodiments, the user authentication device 120 can be a desktop computer, laptop computer, or personal digital assistant (PDA). For example, the authentication device 120 can be implemented as a software program running on a general-purpose computer, possibly interacting with one or more other computer programs on the same or a different computer. In still further embodiments the user authentication device can be a cellular telephone, or specialized hardware embedded in a cellular telephone and adapted to interact with the cellular telephone's circuitry, such as a SIM card. In this example and in others, the authentication device 120 can include two components in communication with each other, for example a wireless communications device (e.g., mobile telephone) and a removable accessory, such as a SIM card. Other sizes, shapes, and implementations are also possible.

Exemplary authentication devices in accordance with the techniques herein are members of the RSA SECURID family of authentication tokens, available from RSA, The Security Division of EMC, of Bedford, Mass. Some RSA SECURID hardware devices, for example, display generated authentication information to a user, who then communicates the displayed authentication information to a computer for communication to a verifier. For example, in one embodiment, the information is a numerical value.

In some embodiments, the user authentication device 120 stores a secret that is used to authenticate the user 110. Typically, the stored secret is information that only is available to the authentication device and the verifier. For example, in one embodiment, the information is a numerical value. The stored secret is used to generate an authentication code for the user 110. The user authentication device 120 also can store or access dynamic data, which, for example, can be the current time, if implemented with a running clock. The user authentication device 120 can also provide other information, or perform other calculations or combination functions, as described further below. For example, in one embodiment, in addition to storing a secret the device 120 receives a personally selected secret from the user 110 (such as a PIN or password) and generates a dynamic, non-predictable authentication code in response to the secret received from the user 110, the stored secret, and the current time. Here, for example, a non-predictable authentication code is not predictable to anyone who does not have access to the secret received from the user 110, the stored secret, and the algorithm that generates the authentication code. The user authentication device 120 optionally can also receive other input, such as a verifier identification, and use that and/or other additional information in the generation of the authentication code.

The exemplary user 110 optionally (and depending on implementation) has one or both of direct access to a communications terminal 140, and indirect access to the communications terminal 140 via the user authentication device 120. The communications terminal 140 can take various forms in various embodiments, including without limitation: a card reader; a device receptacle, cradle, or holder; a personal computer; a telephone; a personal digital assistant (PDA); a network interface card; a wireless transceiver; and so on. For example, during the authentication process the user 110 can directly communicate information to the device 120, the terminal 140 or both the device 120 and the terminal 140. Likewise, the communications terminal 140 can receive direct input from the user 110, the user authentication device 120 or both. As shown, the user 110 optionally communicates directly with the communications terminal via terminal user interface 145 that can be present depending on the implementation of the communications terminal 140. Like the device user interface 130, the terminal user interface 145 can include an input interface, an output interface, or both. The input and the output interfaces can take one or more of the forms described above for the device user interface 130, or other forms.

The communications terminal 140 can optionally provide a device/terminal interface 160 for communications between the terminal 140 and the user authentication device 120. In one embodiment, this interface can take the form of a wired or wireless communications channel between the terminal 140 and the device 120, using standard or proprietary protocols. For example, in an embodiment in which the device 120 is a smart card and the terminal 140 includes a card reader, the communications interface 160 could be a wired serial communications link between the smart card and the reader. In another embodiment in which the device 120 is a token that has wireless communications capability and the terminal 140 includes a wireless transceiver, the interface 160 could be a wireless link.

The communications terminal 140 can provide a user interface 130, via a terminal interface 145, without providing a device interface 160 for the device 120. For example, the terminal 140 can be a telephone that the user 110 uses to communicate authentication information to the verifier 105. In such an embodiment the user authentication information can be voiced by the user. In this embodiment the user 110 dials a telephone number to establish a communications connection with the verifier 105 and speaks the authentication information to the verifier 105.

The terminal 140 and the authentication device 120 can each be integrated, together or separately, into another device, likewise, the functionality of the terminal 140, the device 120 and their respective interfaces 130, 145, 160 can be implemented in separable components. For example, the authentication device 120 can be implemented as an add-in card to a handheld computer (not shown). The handheld computer provides the user interface 130, and also provides the terminal 140 in the form of a wireless network interface. Likewise, a mobile telephone can provide terminal 140 and user interface 130 functions, while the mobile telephone, or a plug-in component such as a SIM card, provides some or all the authentication device 120 function.

The communications terminal 140 communicates information to the verifier 105 via a communications channel 170. The communications channel 170 can be any method and/or interface that enables communication of information to the verifier 105 that is required to authenticate the identity of the user 110. The communications terminal 140 can communicate information generated by the user 110, the device 120, or both, to the verifier 105 over a communications channel 170. The communications terminal 140 and the verifier 105 can implement the communication channel 170 through a variety of connections including standard telephone lines, LAN or WAN links (e.g., 802.11, T1, T3, 56 kb, X.25), broadband connections (ISDN, Frame Relay, ATM), and wireless connections. Connections between the communications terminal 140 and verifier 105 can be established using a variety of communication protocols (e.g., TCP/IP, IPX, SPX, NetBIOS, Ethernet, RS232, and direct asynchronous connections). The verifier 105 processes the information received from the communications terminal 140. The verifier 105 can perform actions in response to authenticating the identity of the user 110. For example, the verifier 105 can grant on-line access to data or physical access to restricted areas or physical items.

The authentication information or code communicated over the communications channel 170 is designed to be dynamic and unpredictable (to an observer without knowledge of the algorithm and/or the secret used to generate the authentication code and/or access to previous user authentication attempts) for each user authentication attempt. In some embodiments, the algorithm is selected such that the authentication code is non-predictable even if the algorithm is known to the attacker. Also, the algorithm may be selected such that knowledge of a large set of previous authentication attempts for a multiplicity of users would not make an authentication code predictable to an attacker.

In some embodiments, in order to authenticate the user, the verifier 105 performs algorithmic calculations for each user authentication attempt that is substantially identical to the algorithmic calculation performed by the user authentication device 120. The verifier 105 compares the authentication information received over communications channel 170 and the authentication information generated by the verifier 105 to determine whether any match. If there is a match, then the verifier 105 can authenticate the identity of the user 110. In one embodiment, when the received and generated user information do not match, the user authentication attempt fails. In some embodiments, the verifier 105 can communicate positive or negative acknowledgement to the communications terminal 140 via the communications channel 170, and the terminal 140 may or may not communicate the acknowledgement to the device 120 or directly to the user 110.

Figure 2:
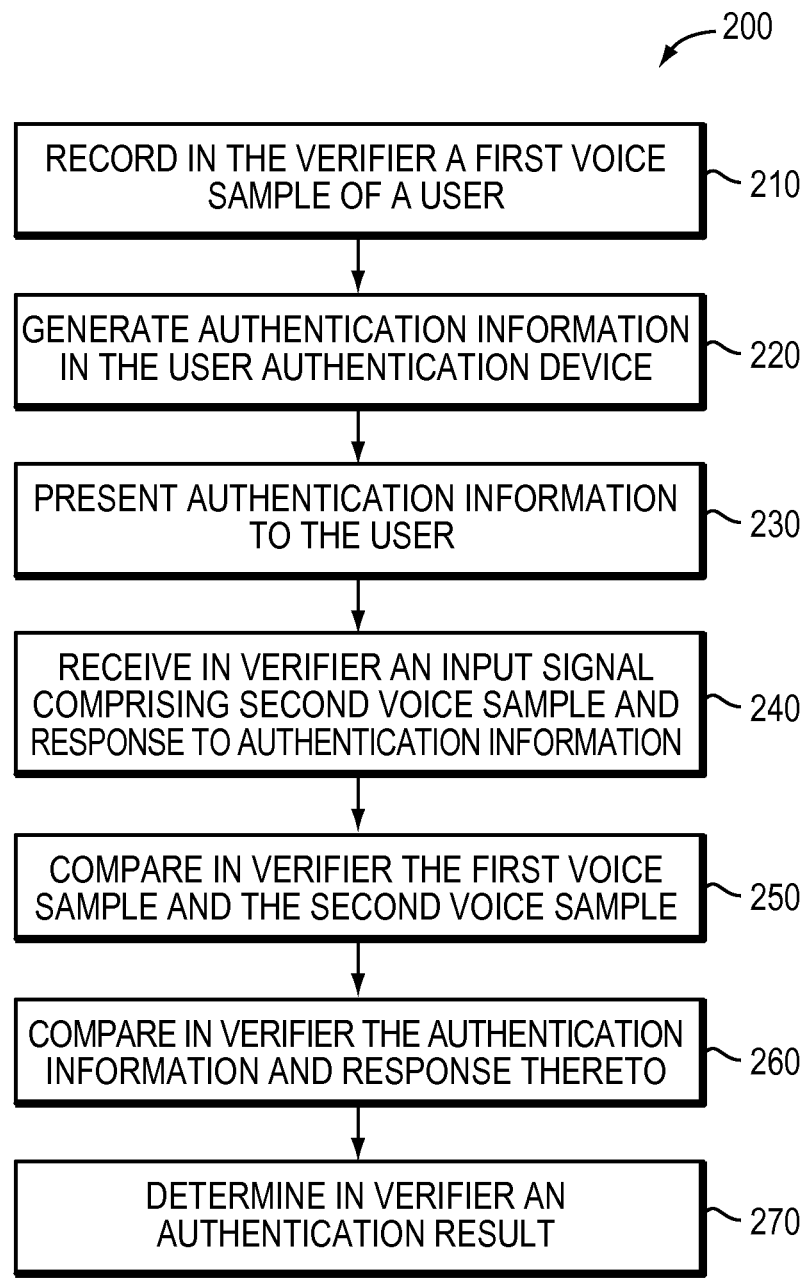
FIG. 2 is a flowchart summarizing the steps of a technique for authenticating a user in an authentication system.

Referring to FIG. 2, there is illustrated a flow chart of an exemplary method 200 for authenticating a user 110 in an authentication system 100 comprising a verifier 105 and a user authentication device 120. The authentication system 100 configured such that the verifier 105 and the user authentication device 120 comprise a shared secret such as a value known only by both. It will be appreciated that in this embodiment the verifier 105 is implemented as software running on a server class computer including a processor and memory for enabling authentication of a large number of users, for example, in an enterprise. Additionally, it will be appreciated that in this embodiment the user authentication device 120 is a portable authentication token. For example, the token may be a RSA SECURID token. This will be described in further detail below.

The method comprises recording 210 in the verifier 105 a first voice sample of a user. In this embodiment, terminal 140 comprises user input interface 145 for capturing a biometric input from the user such as a voice sample of the user. The terminal 140 communicates the voice sample to the verifier 105 via a communications channel 170 such that the sample can be stored and recorded in the verifier 105 for facilitating authentication of the user. It will be understood that the capturing and subsequent recording of the user's voice may be performed during a user enrollment process.

Additionally, the method comprises generating authentication information 220 in the user authentication device 120 such that the information generated comprises dynamic authentication information based on the shared secret. As discussed above, in this embodiment, the user authentication device 120 is an authentication token. Furthermore, the token stores a secret that is used to authenticate the user 110 by generating authentication information for the user 110. Additionally, in this embodiment, the token also stores dynamic data. For example, the dynamic data can be the current time when implemented with a running clock. In such an implementation, the token 120 generates dynamic time-varying information in response to the secret and the current time. It will be appreciated that the dynamic authentication information generated by the user authentication device based on the shared secret is changeable periodically such that the authentication information is valid for authentication for a predetermined period of time only.

Moreover, it will be appreciated that the term "authentication information" used herein is intended to be construed broadly so as to encompass any type of authentication data that may be required in order to obtain access to an access-controlled resource. Thus, the term is intended to encompass, for example, alphabetic or numeric or alphanumeric passcodes, images, sets of words, sentences, phrases, questions/answers, or any other type of authentication data.

Furthermore, the method comprises presenting 230 the authentication information generated in user authentication device 120 to the user. The user authentication device, namely, the token 120 comprises a LCD display for presenting the information to the user. The information may be authentication data as discussed above such that the user can readily ascertain the data on the display. This will be further illustrated and described below.

Moreover, the method comprises receiving 240 in the verifier 105 an input signal comprising at least a second voice sample of the user and a response by the user to the authentication information. The input signal is received in the verifier in response to the user responding to the presented authentication information by voicing the response to the authentication information. In this embodiment, the input signal received in the verifier 105 is received from the terminal 140 via the communications channel 170. The terminal 140 comprises a user interface 145 so that the user can input the response to the authentication information by speaking the response in an authentic voice. The input signal received by the verifier 105 comprises the response to the authentication information and the user's voice.

As discussed above, it will be appreciated that the term "authentication information" used herein is intended to be construed broadly so as to encompass any type of authentication data. For example, in one embodiment, the information may be a numeric value. In such a scenario, the user may respond to the authentication information by simply repeating the numeric value. The input signal received by the verifier 105 comprising the numeric value voiced by the user such that the numeric value and the user's voice can be verified. In another embodiment, the information may be an image or a question. In such a scenario, the user may respond to the authentication information by simply voicing the name of the image or the answer to the question. The input signal received by the verifier 105 in this case comprising the name of the image or the answer to the question voiced by the user such that the name of the image or answer to the question and the user's voice can be verified.

Additionally, the method comprises the steps of comparing 250 in the verifier the recorded first voice sample and the received second voice sample and comparing 260 in the verifier 105 the authentication information generated by the user authentication device 120 and the response by the user to the authentication information. In this embodiment, speech recognition technology is used to analyze the user's utterances to determine if the user has responded to the authentication information correctly. With respect to voice verification, the characteristics of the user's voice (i.e. second voice sample) are compared to the user's recorded voiceprint (i.e. first voice sample). The method comprises determining 270 in the verifier 105 an authentication result based on the comparison of the first and second voice samples and the comparison of the authentication information and the response to the authentication information. Thus, in this particular embodiment, the verifier makes the decision to authenticate the user based on successful verification of the voice and the response to the authentication information. It will be appreciated that the authentication result can be used for authenticating the user.

In one embodiment, the user will be authenticated in response to the authentication result determined by the verifier being within a predetermined threshold of certainty. Alternatively, the user will be denied authentication in response to the authentication result determined by the verifier being outside the predetermined threshold of certainty. For example, the authentication result can be an identity score which indicates the likelihood of the user being an authentic user. If the identity score is determined to be within a predetermined threshold of certainty then the verifier can successfully authenticate the user. Otherwise, if the score is outside the threshold the verifier can deny authentication.

It will be understood that in some embodiments the predetermined threshold of certainty may be set differently for certain actions. For example, if the user is seeking authentication to transfer a large amount of money the threshold may be set so that the likelihood that the user is an authentic user is greater than for a normal action or less important action.

It will also be understood that in some embodiments the user may be required to voice the response to the authentication information on a further second occasion. In these embodiments, the method will compare the voice sample of the first response and the voice sample of the second response. If the voice sample of the first response and the second response are identical the method may be configured for denying authorization. Such an occurrence may be considered as a recording of the user's voice.

It will be further understood that in some embodiments the method may store all second voice samples received such that the method can compare the most recently received second voice sample not only with the first voice sample but also with all previously received stored second voice samples. If the recently received second voice sample is identical with any of the stored second voice samples, the method may be configured to consider the most recently received second voice sample as a recording of one of the previous samples and authentication may be denied.

It will be further understood that in some embodiments the method may be configured to also deny authentication if the recorded first voice sample and the received second voice sample are identical. It may be considered that such a scenario is indicative of a fraudster or attacker recording the first voice sample and subsequently submitting the first sample as the second sample.

It will be appreciated from the foregoing that the description describes a method comprising a step of recording a first voice sample in the verifier. However, it will be understood that in some embodiments subsequent voice samples (e.g., second and third voice samples, etc.) may also be recorded in the verifier enabling a profile of the user to be created. It will be further understood that the profile may not only comprise the user's voice but also user artifacts (e.g., microphone impact), background noise and the like. It will still further be understood that the profile, including one or all of the above profile inputs, could subsequently be used to determine the authenticity of the second voice sample.

It will also be understood that the method or technique described herein can be combined with other authentication techniques to enable even stronger authentication. For example, the user may be required to send a fixed password to the verifier before following the steps of the method or technique described herein.

Figure 3:
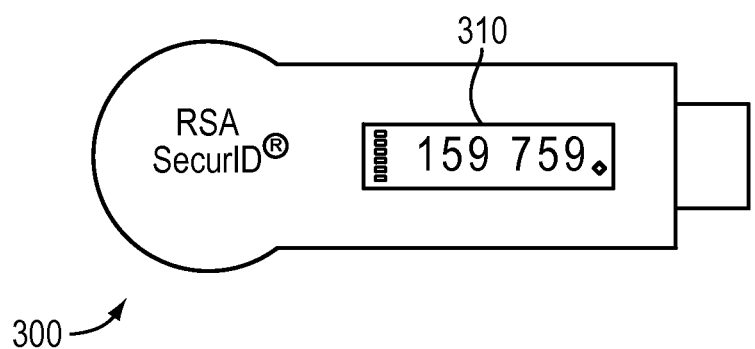
FIG. 3 is an example of a user authentication device.
Figure 4:
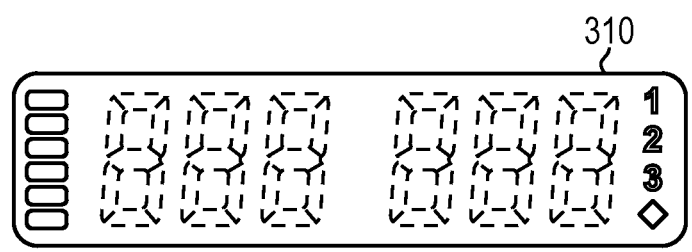
FIG. 4 is an example of a display of the user authentication device of FIG. 3.

Referring to FIGS. 3 and 4, there is illustrated an example of a user authentication device 300 suitable for generating and presenting authentication information for authenticating a user. As discussed above, in this embodiment, the device is a RSA authentication token comprising a LCD display 310 for presenting authentication information to a user such as a numerical value. The display 310 in FIG. 4 is illustrated in a non-energized non-operational state comprising six numerals (888 888) that may represent the authentication information. The display also comprises three peripheral numerals (1, 2, 3) and a diamond character ($\Diamond$) located on the right side periphery thereof. Additionally, the display comprises countdown bars on the left side periphery thereof. The countdown bars may illustrate the time remaining before new authentication information is issued and displayed on the display. For example, new authentication information may be issued and displayed every sixty seconds and one countdown bar may disappear every ten seconds to illustrate the time remaining before new authentication information is displayed.

The device displays the numerals centrally to allow a user to read clearly therefrom. The device in an energized operational state displays the diamond character blinking at a predetermined rate to signify that the device is functioning properly. Additionally, the device displays the peripheral numeral three in response to determining the battery life of the device is to expire shortly. For example, the numeral may be visible in response to determining that the battery life is to expire in a month. Furthermore, the device displays the countdown bars to illustrate the time remaining before new numerals are issued and displayed as described above. Moreover, the device is configured so that the authentication numerals, countdown bars, peripheral numerals and diamond character blink simultaneously in response to detecting an error in connection with the device.

While the invention has been disclosed in connection with preferred embodiments shown and described in detail, modifications and improvements thereon will become readily apparent to those skilled in the art. Accordingly, the spirit and scope of the present invention should be limited only by the following claims.

What is claimed is:

1. A method comprising:
storing at least one enrolled user voice sample;
storing at least one previously submitted user voice sample that was submitted and utilized during a previous authentication attempt;
receiving first and second user voice inputs comprising authentication information voiced by the user;
based on the first and second user voice inputs, determining a first user voice sample, a second user voice sample, and authentication information;
performing a first comparison between at least one enrolled user voice sample and the first user voice sample, wherein the first comparison is configured to determine whether the first user voice sample is the users voice, further wherein the first comparison is configured to determine whether the first user voice sample is a recording of at least one enrolled user voice sample, the first comparison determining a recording in the event that at least one enrolled user voice samples and the first user voice sample are identical;

performing a second comparison between the first user voice sample and the second user voice sample, wherein the second comparison is configured to determine whether the second user voice sample is a recording of the first user voice sample, the second comparison determining a recording in the event that the first and second user voice samples are identical;

performing a third comparison between the first user voice sample and the at least one previously submitted user voice sample, wherein the third comparison is configured to determine whether the first user voice sample is a recording of at least one previously submitted user voice sample, the third comparison determining a recording in the event that the first and the at least one previously submitted user voice samples are identical;

performing a fourth comparison between the authentication information and expected authentication information; and based on the first, second, third and fourth comparisons, generating an authentication result for the user.

2. The method as claimed in claim 1, further comprising:
authenticating the user in response to the authentication result being within a predetermined threshold of certainty.

3. The method as claimed in claim 1, further comprising:
denying authentication to the user in response to the authentication result being outside a predetermined threshold of certainty.

4. The method as claimed in claim 1, wherein the authentication information is based on a shared secret and is changeable periodically such that the authentication information is valid for authentication for a predetermined period of time.

5. The method as claimed in claim 1, wherein a user authentication device comprises a display for presenting generated authentication information to the user.

6. The method as claimed in claim 5, wherein the user authentication device comprises a portable authentication token.

7. The method as claimed in claim 5, wherein the authentication information generated by the user authentication device comprises authentication data.

8. The method as claimed in claim 7, wherein the authentication data comprises a numeric passcode.

9. The method as claimed in claim 5, wherein the authentication information generated by the user authentication device and the authentication information in the first and second user voice inputs are the same.

10. The method as claimed in claim 1, wherein the method is configured for authenticating a user in an authentication system for enabling access to an access-controlled resource.

11. An apparatus, comprising a processor coupled to a memory; wherein the apparatus is configured to:
store at least one enrolled user voice sample;
store at least one previously submitted user voice sample that was submitted and utilized during a previous authentication attempt;
receive first and second user voice inputs comprising authentication information voiced by the user;
based on the first and second user voice inputs, determine a first user voice sample, a second user voice sample, and authentication information;
perform a first comparison between at least one enrolled user voice sample and the first user voice sample, wherein the first comparison is configured to determine whether the first user voice sample is the users voice, further wherein the first comparison is configured to determine whether the first user voice sample is a recording of at least one enrolled user voice sample, the first comparison determining a recording in the event that at least one enrolled user voice samples and the first user voice sample are identical;
perform a second comparison between the first user voice sample and the second user voice sample, wherein the second comparison is configured to determine whether the second user voice sample is a recording of the first user voice sample, the second comparison determining a recording in the event that the first and second user voice samples are identical;
perform a third comparison between the first user voice sample and the at least one previously submitted user voice sample, wherein the third comparison is configured to determine whether the first user voice sample is a recording of at least one previously submitted user voice sample, the third comparison determining a recording in the event that the first and the at least one previously submitted user voice samples are identical;
perform a fourth comparison between the authentication information and expected authentication information; and
based on the first, second, third and fourth comparisons, generate an authentication result for the user.

12. The apparatus as claimed in claim 11, further comprising:
authenticate the user in response to the authentication result being within a predetermined threshold of certainty.

13. The apparatus as claimed in claim 11, further comprising:
deny authentication to the user in response to the authentication result being outside a predetermined threshold of certainty.

14. The apparatus as claimed in claim 11, wherein the authentication information is based on a shared secret and is changeable periodically such that the authentication information is valid for authentication for a predetermined period of time.

15. The apparatus as claimed in claim 11, wherein a user authentication device comprises a display for presenting generated authentication information to the user.

16. The apparatus as claimed in claim 15, wherein the user authentication device comprises a portable authentication token.

17. The apparatus as claimed in claim 15, wherein the authentication information generated by the user authentication device comprises authentication data.

18. The apparatus as claimed in claim 17, wherein the authentication data comprises a numeric passcode.

19. The apparatus as claimed in claim 15, wherein the authentication information generated by the user authentication device and the authentication information in the first and second user voice inputs are the same.

20. The apparatus as claimed in claim 11, wherein the system is configured for authenticating a user in an authentication system for enabling access to an access-controlled resource.

* * * * *